United States Patent [19]

Sibbel

[11] Patent Number: 4,685,827
[45] Date of Patent: Aug. 11, 1987

[54] WATERING SYSTEM

[76] Inventor: Uwe Sibbel, Berlin-West, Fed. Rep. of Germany

[21] Appl. No.: 771,132

[22] Filed: Aug. 27, 1985

Related U.S. Application Data

[63] Continuation of Ser. No. 684,986, Dec. 21, 1984, abandoned, which is a continuation of Ser. No. 269,281, Jun. 1, 1981, abandoned, which is a continuation-in-part of Ser. No. 224,250, Jan. 12, 1981, Pat. No. 4,347,687, which is a continuation of Ser. No. 040,883, May 21, 1979, abandoned, and a continuation-in-part of Ser. No. 90,086, Nov. 1, 1979, abandoned.

[51] Int. Cl.[4] .............................................. E02B 13/00
[52] U.S. Cl. .................................... 405/37; 239/542; 405/39; 405/42
[58] Field of Search ...................... 405/36, 37, 39, 40, 405/41, 42, 44; 239/542

[56] References Cited

U.S. PATENT DOCUMENTS

| | | | |
|---|---|---|---|
| 1,123,888 | 1/1915 | Kempf | 405/42 |
| 1,710,362 | 4/1929 | Korneff | 405/37 |
| 3,407,608 | 10/1968 | Whitehead | 405/37 |
| 3,518,831 | 7/1970 | Tibbals | 405/39 X |
| 4,161,291 | 7/1979 | Bentley | 239/542 |
| 4,221,501 | 9/1980 | Saburi | 405/37 |

Primary Examiner—David H. Corbin
Attorney, Agent, or Firm—Jacobson and Johnson

[57] ABSTRACT

A plant watering system for flower pots, plant boxes or open fields which uses watering cylinders located adjacent to the plant roots with the watering cylinders connected to a water supply unit through a closed pipeline system with the water supply unit maintaining a constant level of irrigation water. Moistening of the soil in the region of the watering cylinders permits the inherent suction intensity of the soil to suck water from the reservoir to the plant root when the available water in the soil is low and to not suck water from the reservoir when there is adequate moisture in the soil. The watering cylinders having means to prevent growth of roots therein while permitting water to be discharged to the surrounding soil.

20 Claims, 14 Drawing Figures

WATERING SYSTEM

CROSS REFERENCE TO RELATED APPLICATIONS

This application is a continuation of application Ser. No. 684,986, filed Dec. 21, 1984 now abandoned, which is a continuation of Ser. No. 269,281 filed June 1, 1981, now abandoned, which is a continuation-in-part of my U.S. patent application Ser. No. 224,250 filed Jan. 12, 1981 now U.S. Pat. No. 4,347,687, titled "Watering System for Flower Pots and Plants" which is continuation of my U.S. application Ser. No. 040,883 filed May 21, 1979, now abandoned, and a continuation-in-part of my U.S. patent application Ser. No. 90,086 titled "Watering Systems for Agriculture" which was filed Nov. 1, 1979, now abandoned.

BACKGROUND OF THE INVENTION

1. Field of the Invention

This invention relates generally to watering systems and, more specifically, to automatic plant watering systems.

2. Description of the Prior Art

U.S. Pat. No. 2,072,185 shows a flower pot watering system in which water from an overhead source is supplied to the bottom of the pot and is wicked to the soil through an asbestos wick.

U.S. Pat. No. 2,183,970 shows a soil moistening device where water is supplied to the trough of the plants and means to maintain the water level at a substantially constant level. A wick is provided to transport moisture into the plant roots.

U.S. Pat. No. 4,023,305 shows a porous disc located at the bottom of the flower pot and a hose connected to the disc. A squeeze bulb permits excess water to be removed from the bottom of the plant roots through the porous disc and hose.

U.S. Pat. No. 1,157,671 shows an overhead heater fuel system having a mechanical shut off valve to stop the flow of fuel oil into the burner. No self leveling is included.

German patent No. 2,509,724 shows a plant pot container having hollow walls and a filling tube for filling with water to a predetermined level. The hollow wall reservoir provided by an internal supply of water to a plant in the pot.

German patent No. 2,610,613 is an irrigator for potted plants and provides a sleeve-like cage for placing in the bottom of a pot. The sleeve surrounds a capillary insert which is placed in water and is used to supply water to the rest of the plant.

French patent No. 7,532,174 shows an air/water regulation system to control the level of water/air to be supplied to the plants.

Russian patent No. 256,298 shows a water liquid livel controller and closed pressure vessel that controls the level of liquid in an elevated reservoir.

German Document No. 837,332 shows various types of inserts for elevating water from a lower reservoir.

German Document No. 6609705.0 shows some type of a plant box.

German Document No. GM 1981.636 shows some type of a wick.

German Document No. GM 1910.767 shows a plant container with insert.

German Document No. 1901238 shows some type of a watering system.

Offenlegungsschrift No. 27 17 527 shows a water system to regulate the water level.

Offenlegungsschrift No. 27 14 115 shows a water level system for maintaining the level of water available for plants.

Offenlegungsschrift No. 26 45 994 shows another system for maintaining the water level at a predetermined level. The water feed uses a vertical level limiting ventilation pipe which is used to control the level of the water in the system.

Offenlegungsschrift No. 21 49 072 shows a plant wick system.

Offenlegungsschrift No. 17 57 347 shows a water level and wick system.

Offenlegungsschrift No. 25 09 724 shows a plant pot with a water reservoir.

Offenlegungsschrift No. 26 10 613 shows an irrigator for potted plants.

The phenomenon of soil suction is known and soil science texts teach that water having a suction intensity of 1,000 to 10,000 centimeters of water is available for plant use.

BRIEF SUMMARY OF THE INVENTION

Briefly, the invention comprises a system that removes water from a supply source through the variation of the soil suction intensity. When the soil suction intensity is high, water is sucked from water reservoir; however, when the soil suction intensity is low, the available soil water can be used to irrigate plant roots. A plurality of water sockets surrounded by moistened soil particles permit the soil suction to suck water from a water reservoir but prevent the water outlets in the water sockets from becoming clogged with plants and roots.

BRIEF DESCRIPTION OF WATERING SYSTEM AND OPERATION

A suitable watering system includes watering cylinders which are connected to a water supply unit through a closed pipeline system. In one embodiment the water supply unit maintains the supply water at a constant level to permit continual watering of the plant roots in flower pots or plant boxes. The watering cylinders contain foam plugs which have cohering pores to prevent the penetration of soil from the roots into the watering channel and to also retard root growth into the watering channel. The quantity of the water supplied to the plant roots is controlled by the pressure of the water in the pore space around the roots and by adjusting the reference level of water in the pipeline system connecting to the water supply unit.

Typically, the watering cylinders are molded into the flower pots or plant boxes; however, they may be made separately and inserted into the plant box. The water supply unit attaches to a water container and comprises a tube made of transparent material which also functions as a visual water level indicator. A ventilation pipe fits into the transparent tube and is hermetically sealed to the top of the tube by a rubber or elastic collar seal that permits vertical displacement of the ventilation pipe within the transparent tube. The lower end of the ventilation pipe controls the level of water supplied to the flower pots.

In the alternate embodiment of a suitable watering system the watering system utilizes the inherent characteristic of the water and soil conditions. It is therefore an object of the invention to provide a novel watering system for agriculture comprising an underground pipeline having a plurality of vertical water supply sockets with water outlets shielded against penetration by soil and plant roots. The pipeline is supplied with water from a water tank having a water tube extending nearly to the bottom of the water tank. The water tube connects via a three-way selection filling valve either to a supply pipe or to the pipeline. Located vertically in the ground is a water supply unit that has an air- and water-tight pipe head that connects with the top of the water tank by an air tube. A level limiting reference tube for marking the installation depth of the pipeline is installed in the water supply unit. A ventilation tube extends through the pipe head into the lower portion of the water supply unit. A water supply tube is located in the water supply unit and reaches to the bottom of the water supply unit. The water supply unit connects via the filling valve with the water tube in the water tank. Located at the other end of the pipeline is a cleansing shaft. The cleansing shaft is installed at least as deep as the lower end of the water supply sockets in the ground. The depth of the cleansing shaft depends on the installation depth of the pipeline and the maximum suction intensity of the known phenomena of soil suction intensity.

Briefly, as the water content of the soil decreases, the suction intensity of the soil water increases and the water flows out of the water supply sockets to reach the pore space of the soil. This produces a capillary fringe around the individual water supply sockets which makes connections with the capillary fringes of adjacent water supply sockets to thus water the soil. This spreading of the water is possible in moist soils. To start a newly intalled watering system in dry soil one must first moisten the soil by seeping water from the surface into the area of water supply sockets.

Conversely, with an increase of water content of the soil the suction intensity of the soil water decreases. Between the suction intensity of the soil water and the columns of water in the watering system it has been found that an equilibrium level is automatically adjusted. In the equilibrium condition the water supply to the pore space of the soil stops. With decreasing water content of the soil the suction intensity increases to supply water to the pore space of the soil as long as there is equilibrium between the water column of the system and the suction intensity of the soil water. The preselected water content of the soil remains constant, whereby the reference level can be adjusted manually.

Thus, the watering system according to the invention uses the suction intensity of the soil water in order to raise the supply water from the lower reference level via pipelines. Thus, under certain circumstances the natural ground water has a level in an open well tube which reaches or exceeds the reference level within the watering system. In this case the water supply of the watering system is supplied from the ground water as long as the level of the ground water is above the reference level of the watering system. When the level of the ground water is below the reference level of the watering system, means for preventing the flow of water out of the watering system in the ground water are provided.

DETAILED DESCRIPTION OF WATER SUPPLY SYSTEMS AND SOIL IRRIGATION UNITS

Figure 1:
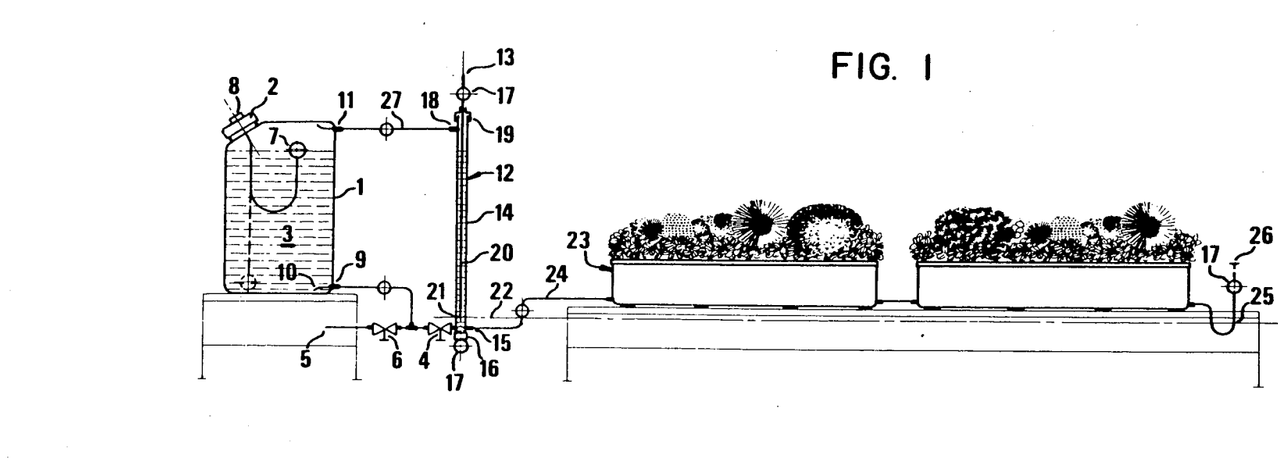
FIG. 1 shows the watering system for plants.
Figure 9:
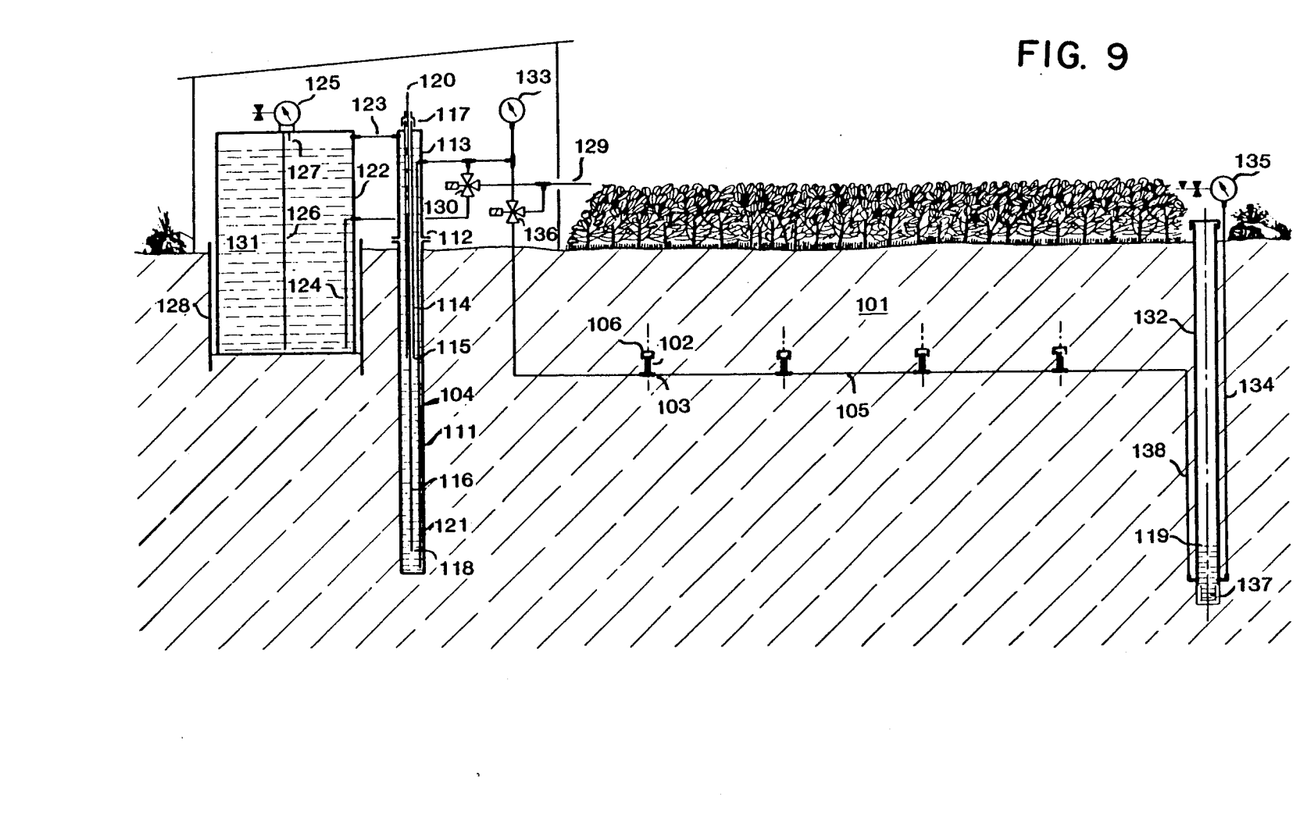
FIG. 9 is the vertical cut through a part of the watering system installed in the ground.
Figure 14:
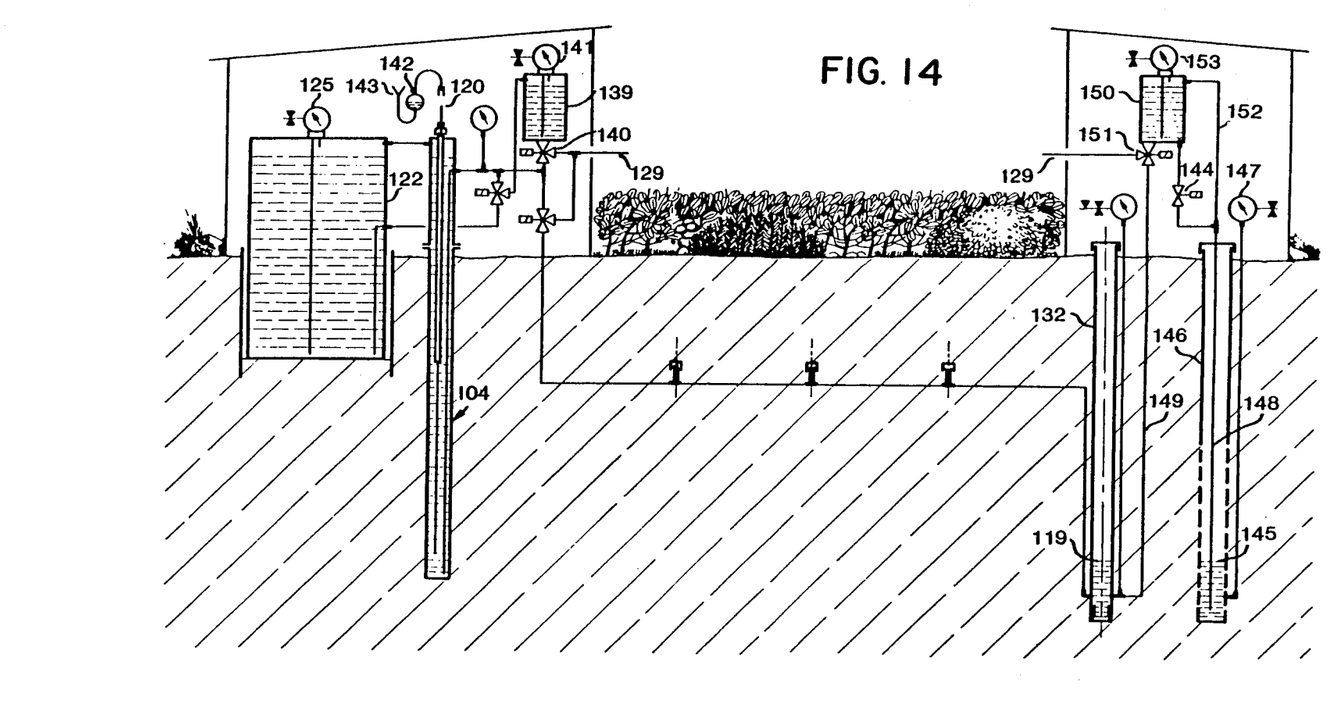
FIG. 14 is a vertical cut through a part of an extended watering system supplied by ground water.

Three embodiments of a hydromechanical watering system are shown in FIGS. 1, 9 and 14. All the system maintains a constant level of water through use of the atmospheric reference pressure. The system of FIG. 1 comprises a hermetically closed water container 1 which can be filled in three different ways.

First, water container 1 can be filled with water by closing relief valve 4 and removing the air-tight closeable screw cover 2. Water or fertilizer can then be added through the opening in container 1.

Second, water container 1 can be filled by connecting a tap or faucet to pipeline 5. To fill container 1 through pipeline 5 one connects the source of tap water to pipeline 5, closes relief valve 4 and opens filling valve 6. Turning on the tap allows water to flow through filling pipe 5 into water container 1. A ventilation pipe 20 connected to water container 1 allows air to escape from the water container thereby allowing one to fill water container 1 without removing the air-tight closeable screw cover 2.

Third, water container 1 can be filled automatically by using electromagnetically operated valves 4 and 6 which are controlled by a float switch 7. The filling is accomplished the same as in the second method; however, the float switches and electromagnetically operated valves permit automatic refilling of water container 1.

During filling of the water container 1 using filling pipeline 5, water enters water container 1 through a water tube nipple 9 and a nozzle pipe 10. The incoming water increases the air pressure in top of container 11 thus forcing air in the top of water container 11 to discharge through an air tube nipple 11. The increased pressure in nozzle 11 and pipeline 27 forces the level of water in transparent tube 12 below the level of ventilation tube 13 to permit air to discharge into the lower end of vertical ventilation pipe 20. If water container 1 is filled manually, the operator terminates the filling operation when water begins to enter nipple 11. After filling, valve 4 is opened and valve 6 is closed.

Water supply unit 12 comprises a transparent vertical tube 14 having at the lower end a water tube nipple 15 for connection to a flower box and a water-tight pipe cover 16 which seals the lower end of cylindrical pipe 16. Pipe cover 16 can be removed for cleaning purposes. Water pipe cover 16 has a fastener (not shown) for attaching water supply unit 12 and support members 17 to a wall. Located at the top end and on the side of water supply unit 12 is a rubber sleeve or collar 10 that forms an air-tight seal between tube 14 and a vertical ventilation pipe 20. Ventilation pipe 20 extends through rubber sleeve 19 and is located coaxially within tube 14. Ventilation pipe 20 comprises a straight cylindrical tube with a passage therein that permits air to flow through ventilation pipe 20 while collar 19 prevents air from flowing past the exterior surface of ventilation pipe 20. The lower end of ventilation pipe 20 controls the reference level 22 of the supply water to plant boxes 23 through a water pipeline 24. That is, the water level in the plant boxes is determined by the horizontal plane that extends through the bottom of ventilation pipe 20.

To enable a remote check of the water level of the system one can check water level in a transparent tube located at the end of plant boxes 23. Tube 25 connects through supply lines to the water supply unit 12. To check the water level by visual inspection one removes the air-tight closing stopper 26 and allows the water in the system to seek the reference level 22 in tube 25. This allows a remote user to check the level of the water in container 1 by determining if water enters tube 25.

The reference numeral 22 generally indicates the reference level 22 of the water supplied to the plant boxes 23. Note, the water level is in ths same horizontal plane as the bottom of ventilation pipe 20. In operation, the water level of the system remains at the level of lower end 21 of ventilation pipe 20 as long as there is water available in water container 1. In operation, the end of ventilation pipe 20 is raised until a water level is maintained in a channel located in the bottom of the flower pot or box. Typically, the water level is adjusted by trial and error or visual comparison of the water level to water channel depth.

In normal operation of water supply unit 12 the absorption of water by plants reduces the water level in water supply unit 12. Removing water from water supply unit 12 causes a reduction of pressure in container 1 and water supply unit 12. As the pressure decreases within the containers, the atmospheric pressure acting on the water level in ventilation pipe 20 forces the water level below the end of ventilation pipe 20. This allows air to enter transparent pipe 14 through the lower end 21 of ventilation pipe 20. As air enters ventilation pipe 20, it rises to the top of pipe 14 and enters container 1 through air pipe nipple 18, pipeline 27 and nozzle 11. This increases the air pressure in container 1 and allows water to flow from container 1 into water supply unit 12 until the lower end of ventilation pipe 20 fills with water 23. When the water level in the ventilation pipe 20 is above the end of ventilation tube 12, water can no longer flow above the reference level 22. As water is consumed through a set of watering cylinders, water flows through nipple 15 and pipeline 24 to plant boxes 23 causing the process to repeat and allow further water to enter water supply unit 12. However, in no event does the water level in the plant or flower boxes exceed the water level determined by the end of ventilation pipe 20.

Figure 2:
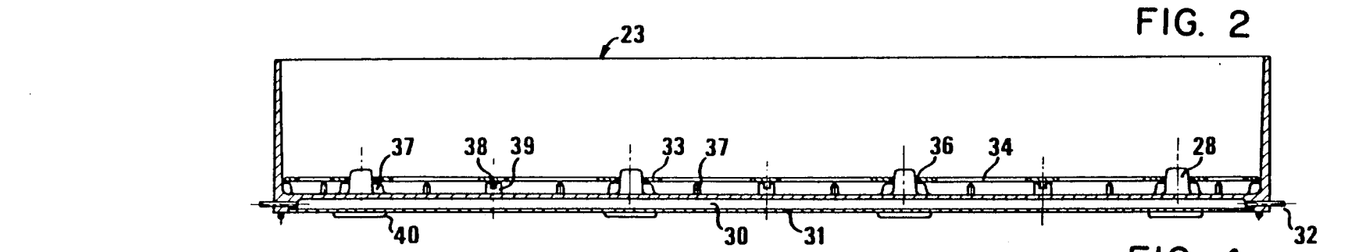
FIG. 2 shows the side sectional view of a plant box.
Figure 3:
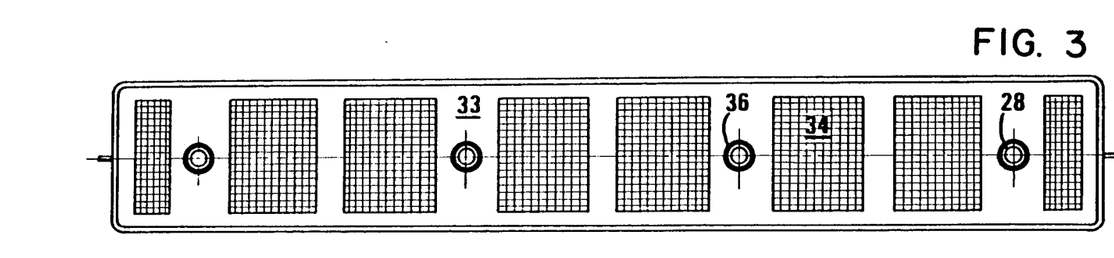
FIG. 3 shows a top view of a plant box.
Figure 4:
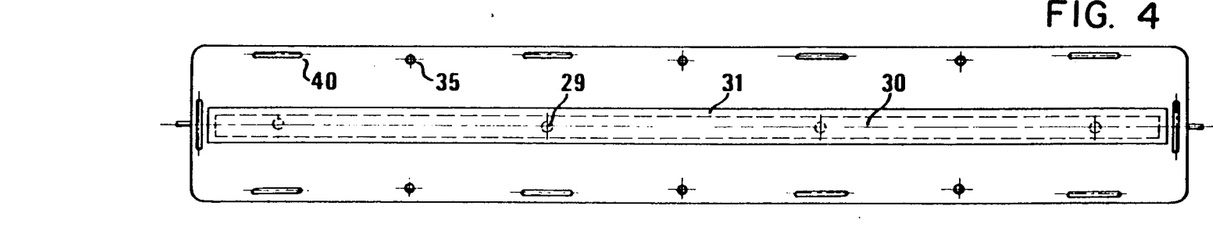
FIG. 4 shows a bottom view of a plant box.

Referring to FIGS. 2, 3 and 4, the watering cylinders are shown in greater detail. FIG. 2 shows a side view of plant box, FIG. 3 shows a top view and FIG. 4 shows a bottom view of plant box 23. Plant box 23 contains four watering cylinders 28 that are supplied with water through water holes 29 which are connected to water supply channel 30. Located on top of water supply channel 30 is a water-tight covering strip 31 that is fastened thereto with a suitable adhesive. A nipple 32 located on the end of plant box 23 permits plant boxes 23 to be connected to a water supply unit 12 or to another plant box. The intermediate bottom 33 contains large grid areas 34 to ensure ventilation of the plant roots.

Spaced along the bottom of plant box 23 are supporting ribs 37 that support the intermediate bottom 33. A slot 33 at the upper end of the ventilation columns 39 which contain the ventilation holes 35 prevents the sealing of ventilation holes 35 by intermediate bottom 33. The bottom ribs 40 on the outside of plant box 23 provide spacing of the plant box from a supporting surface to prevent sealing of ventilation holes 35 when the plant box is placed on a base.

Figure 5:
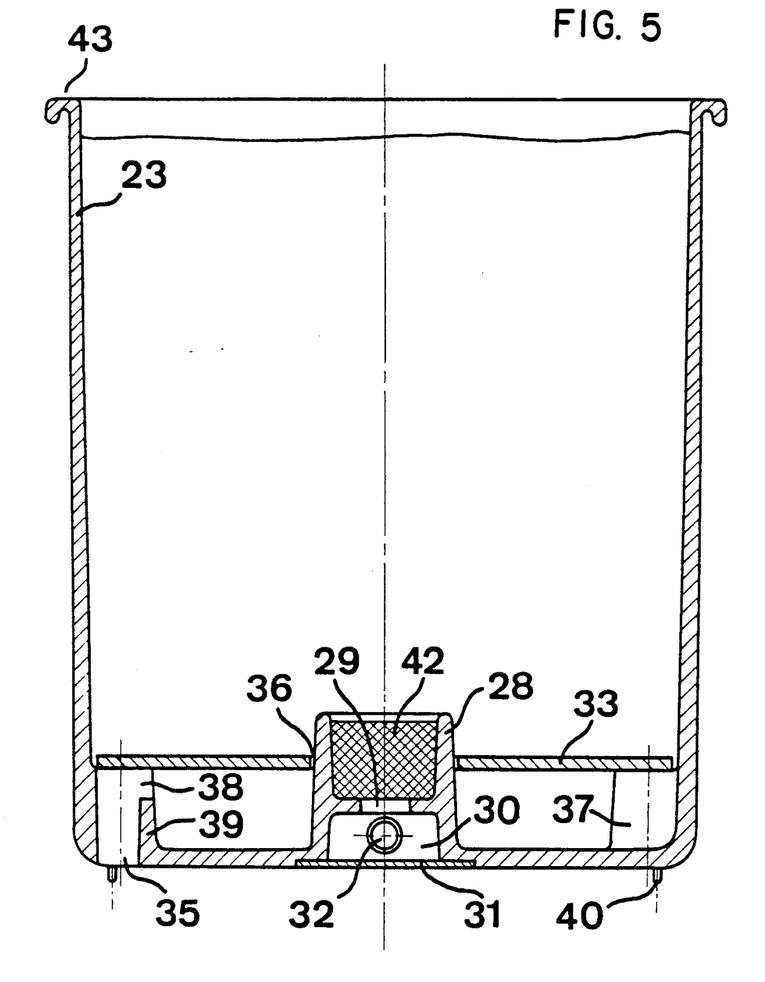
FIG. 5 shows a cross sectional view of a plant box.

FIG. 5 shows a cross sectional view of a plant box 23 with a watering cylinder 28. The top of plant box 23 contains a reinforced ridge 23 to provide strength to the thin wall plant box 23. Sealed on the bottom of plant box 23 is a covering strip 31 that forms a portion of watering channel 30 that extends along the bottom of plant box 23. In operation, water enters channel 30 through nipple 32; note, the intermediate bottom 33 rests upon supporting rubs 37 and is above water channel 30. A hole 36 permits condensation or excess water to flow to the enclosed chamber below intermediate bottom 33. A slot 38 in ventilation columns 39 prevents sealing of the exterior ventilation hole 35. Slot 38 is positioned high enough so that the condensing water from the roots of the plants cannot flow out of plant box 23. Watering hole 29 within watering cylinder 28 is covered with a foam material plug 42 which prevents the soil or roots from entering watering channel 30. Watering cylinders 28 of plant boxes 23 shown in FIGS. 2 to 5 are formed together with the plant boxes 23 in one piece. The watering cylinders can have any shape such as round, square or rectangular. In addition, the watering cylinders can be made of plastic and can be manufactured together with the flower pot or plant box in one piece by injection molding. In typical usage, the water level would be adjusted so as to maintain channel 30 in a full condition and extend at least partially into polymer foam plug 42.

Figure 6:
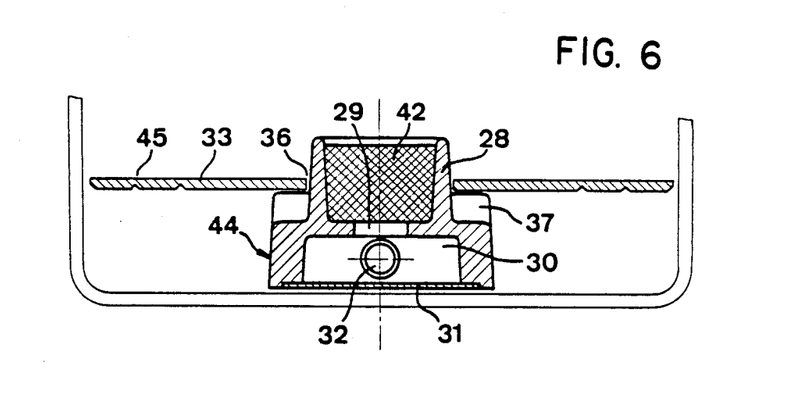
FIG. 6 shows a separate watering element for existing plant boxes.

FIG. 6 shows a modification of the invention whereby watering cylinders 28 are attached to a separate watering element 44 which can be inserted into existing plant boxes or flower pots. The intermediate bottom 33 is provided with corresponding holes 36 having break notches 45 for the adaptation of intermediate bottom 33 to existing plant boxes or flower pots. Separate watering elements 44 can be attached to one another or used individually.

Figure 7:
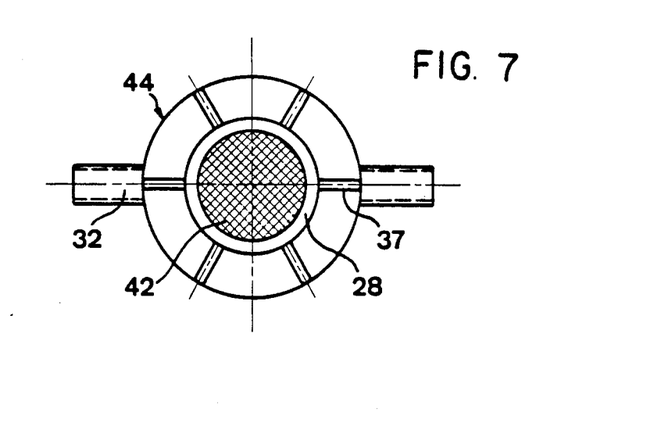
FIG. 7 shows a top view of a watering element.

FIG. 7 shows a top view of watering element 44 with only one watering cylinder 28 having a polymer foam plug 42. Supporting ribs 37 are spaced regularly around the watering cylinder 28 to provide connection of watering elements 44 to each other. Nipples 32 are provided on opposite sides of watering cylinder 28.

Figure 8:
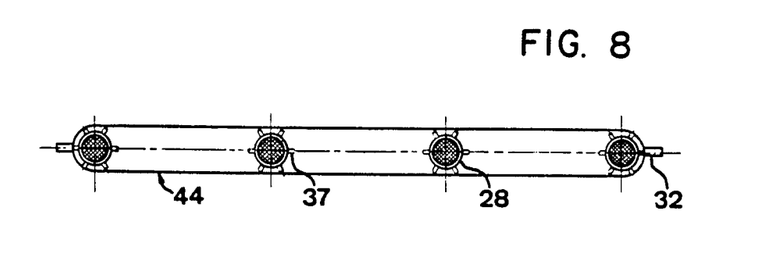
FIG. 8 shows a top view of a watering element with four watering cylinders.

FIG. 8 shows a top view of an alternate embodiment of watering element 44 having a common water chamber (not shown) with four watering cylinders 28 with equally spaced supporting ribs 37 attached around the periphery of each watering cylinder 28. Located on ends of watering element 44 are two nipples 32 for attachment to the water system on additional plant boxes.

From soil science it is known that water having a suction intensity of 1,000 to 10,000 centimeters of water is available for plants. A watering system in conjunction with the soil suction can use ground water from a depth of 10 to 100 meters without additional energy. The limit of the water lift is defined by the maximum suction intensity at the water supply sockets of the watering system. The suction intensity at the water supply sockets depends on the installation depth in the soil and the granulation of the soil layer. Generally, higher suction intensity values can be obtained by a deeper installation of the water supply sockets. Soil of finer grain causes higher suction intensities than soil of coarser grain.

It is known that water separates absorbed air formed bubbles in the pipelines at a reduced pressure of 1,000 centimeter of water. This causes disturbances, especially with the running water in downward leading pipes. In order to prevent these disturbances, an air collecting vessel is installed at the highest point of the pipeline system. Thus, air collecting vessel is ventilated when the watering system is filled. In order to appreciate the operation of a watering system for use in conjunction with the soil suction intensity reference should be made to FIG. 9.

Figure 10:
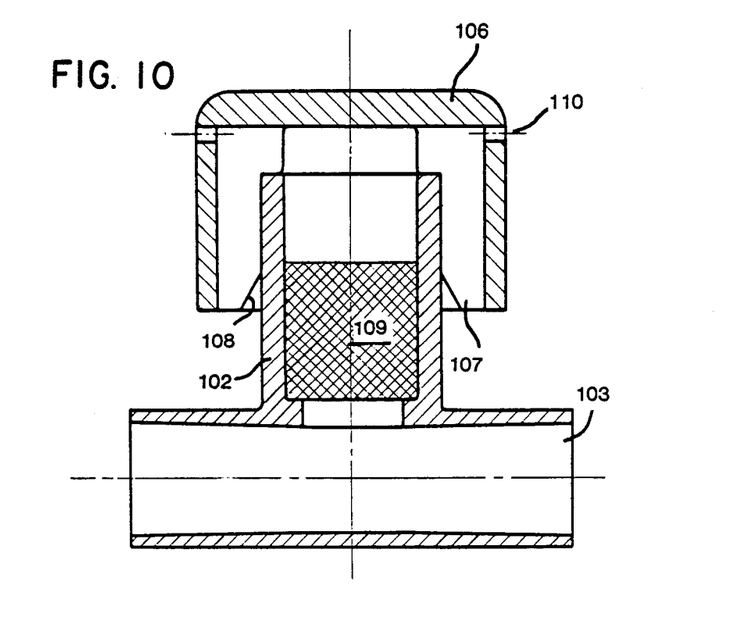
FIG. 10 is a vertical cut through a water supply socket with an attached cylindric cap and inserted foam material plug.
Figure 11:
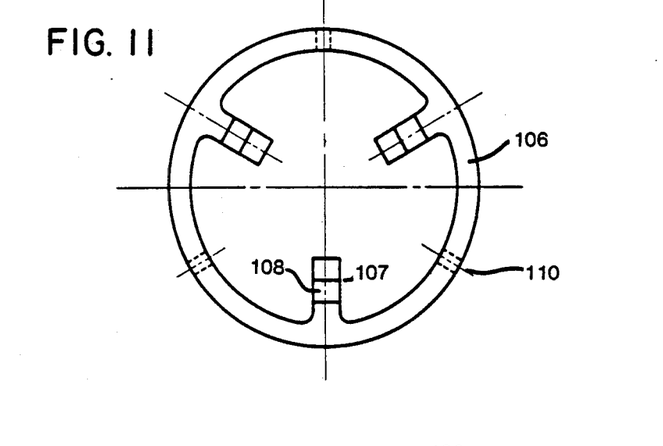
FIG. 11 is the front view of a cylindric cap with three guide braces and three air outlet holes.

As illustrated in FIG. 9, the watering system comprises water supply sockets 102 covered by cylindric caps 106 installed in the same level in spaced distances in soil 101. Sockets 102 are connected serially to the water supply unit 104 via valve 136, pipeline 105 and pipeline 103. Referring to FIG. 10 and FIG. 11, a cylindric cap 106, which is attached from above on the water supply socket 102, prevents soil 101 from dropping into water supply socket 102 and into pipeline 103.

Cylindric cap 106 has interior spaced brackets 107 with facets 108 to ensure an easy attachment on water supply sockets 102 and provide for flow of water through socket 102.

The water outlets in water supply sockets 102 can vary as determined by system installers. For the ventilation of water supply sockets 102 in the upper part of cylindric cap 106, air outlet holes can be applied. The growth of plant roots into the pipeline 105 is prevented by the insertion of a foam material plug 109 into the water supply socket 102.

Figure 12:
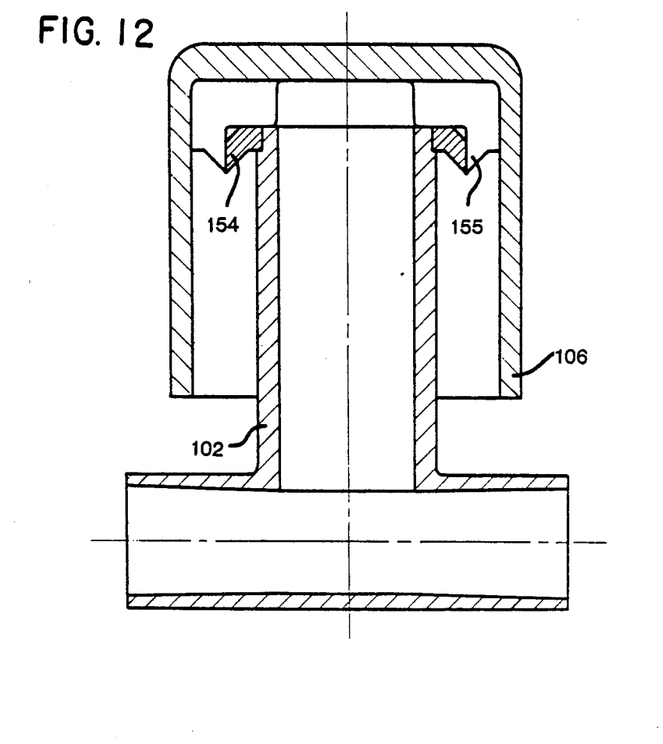
FIG. 12 is a vertical cut through a water supply socket with an attached drip ring and a cylindric cap with dripping guide braces.
Figure 13:
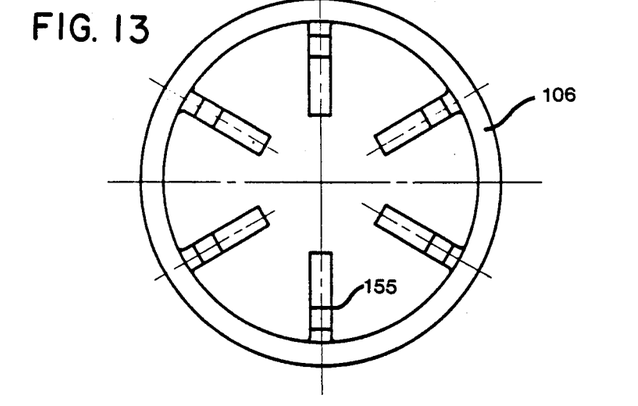
FIG. 13 is the view from below of a cylindric cap with six dripping guide braces.

According to FIGS. 12 and 13, the growth of plant roots can also be prevented by attaching a drip ring 154 in the water supply socket 102. The water flowing out of the socket and into the air space within cylindric cap 106 drips from spaced brackets 155 to keep the plant root ends down. Such water supply sockets 102 with drip rings 154 are suitable in certain cases where a sufficient distance between the water supply sockets 102 and the plant roots cannot be maintained.

Water supply unit 104 includes a water-tight casing 111 which can be installed in a hole in soil 101. Casing 111 connects to a casing pipe head 113 by an air- and water-tight flange connection 112. The tubes located within water supply unit 104 connect only with pipe head 113 so that casing 111 of water supply unit 104 can remain in soil 101 during installation and maintenance work on the system. The length of casing 111 depends on the installation depth of the water supply sockets 102 and the desired range of the suction intensity of the soil water. Typically, with water supply sockets 102 at a depth of 2 meters below the ground surface and the suction intensity of the soil water ranging up to 10 meters, one inserts water supply unit 104 up to 12 meters into the ground.

For convenience in position the water supply sockets at a proper depth, the water supply unit 104 includes a level limiting tube 114 which is inserted through pipe head 113 into casing 111. Level limiting tube 114 forms an air-tight connection with pipe 113. The lower end 115 of limiting tube 114 is located below the upper edge of the water supply sockets 102. Level limiting tube 114 is used during installing process to position the water supply sockets 2 at the same level by using reference end 115 to set the water level in sockets, i.e., once the system is installed, level limiting tube 114 is no longer used.

Located in level limiting tube 114 is a ventilation tube 116 which forms air-tight seat at its upper end with level limiting tube 114 through a rubber sleeve 117 and hose clips. Ventilation tube 116 extends nearly to the bottom of tube 111. For ease in handling and adjusting ventilation tube 116 may be made of heavy-walled elastic hose which can be rolled into a ring or may be assembled from shorter tubes.

By vertical positioning the ventilation tube 116 within connection 117 permits one to set the lower end of ventilation tube 116 and water level 119, i.e., when the system is in operation, it has shown the reference level end 118 determines the reference water level 119. In the embodiment of FIG. 9 the ventilation tube top end 120 of ventilation tube 116 ends in the open air. The water supply unit 104 comprises a water supply tube 121 mounted in an air-tight connection through pipe head 113 water supply tube 121 extends nearly to the bottom of casing 111. Also, if desired, the relatively long water supply tube 121 which may comprise an elastic hose for better handling or may be assembled by shorter tube parts. The pipe head 113 of water supply unit 104 connects to the air space in the top of water tank 122 by an air tube 123 having air-tight connections on either end.

Water tank 122 comprises a hermetically sealed tank having a top fitting for air tube 123 and an interior water tube 124 extending vertically down to the bottom of tank 122. Water tank 122 has a differential pressure gauge 125 with a top pressure sensor 126 in the bottom area and a vacuum sensor 127 in the upper air space of water tank 122. The pressure gauge 125 indicates the filling level in water tank 122.

By using an open casing 128, water tank 122 can be installed partly in the ground. For filling the water tank 122 out of a supply pipe 129 there is provided a three-way/two-way valve filling valve 130 which connects supply pipe 129 with water tube 124 and also isolates water tube 124 from water supply unit 104. With filling valve 130 open to pipe 124 and pipe 121 water flows into both tank 122 and tube 121.

When filling water tank 122 from supply pipe 129 water flows through filling valve 130 and water tube 124 into tank 122. The water tank 122 fills from the bottom as air escapes from the top of water tank 122 via air tube 123, water supply unit 104 and ventilation tube 116. Due to the increase in pressure at the top of tank 122 the water in water supply unit 104, which is above the reference level end 118 at the beginning of the filling process, is forced through water supply tube 121 and pipeline 105 into water supply sockets 102 and into the cleansing shaft 132. After filling tank 122, one closes filling valve 130 to shut off supply pipe 129 closing valve 130 also connects water tube 124 with water supply tube 112 of the water supply unit 104. The water level in tube 111 rises to the same level as water tank 122 through the well known siphon action in which water can flow uphill through a closed tube to seek its own level. The water level in ventilation tube 116 also rises to the water level in cleansing shaft 132.

It will be seen the embodiment of FIG. 9 is similar to the embodiment of FIG. 1 except that the water reference level is maintained a considerable distance below water sockets 102. It is the phenomena of soil suction which permits the water to be drawn from water supply unit 104 and cleansing shaft 132. That is, as the soil suction intensity in the area adjacent the water socket increases, water is sucked from water supply unit 104 and cleansing shaft 132 in much the same manner one sucks through a straw. Thus water is supplied to the plant roots. On the other hand, if the soil suction intensity decreases due to increasing ground water, the soil suction intensity is insufficient to suck the water from water supply unit 104 and cleansing shaft 132. In this condition the ground water can be used to supply water to the plants.

Thus, the suction intensity at the water supply sockets 102 corresponds to the water head difference between the upper end of the water supply sockets and the water level in the cleansing shaft 132. With decreasing water content in the soil 101 the suction intensity of the soil water increases and water is sucked out of water supply sockets 102 into the pore space of the soil. This causes a sinking of the water level within cleansing shaft 132 and within ventilation tube 116. As soon as the water level within ventilation tube 116 reaches reference level end 118, air flows through ventilation tube 116 into tube 111 and rises to the surface. The air flows via air tube 123 into water tank 122. The addition of external air increases the pressure in water tank 122. Correspondingly, the increased pressure in tank 122 permits water 131 to flow through water tube 124 filling valve 130, cleansing valve 136, pipeline 105, cleansing pipe 138 and into cleansing shaft 132. As the water rises in cleansing shaft 132, the water level in the ventilation tube 116 rises to block the entrance of air into the reference level end 118. Consequently, if no air enters the system the water stops flowing into cleansing shaft 132. The level of the reference level end 118 determines the reference level 119 of the water in pipeline 105 of the watering system.

The water level difference between the upper end of the water supply sockets 102 and the reference level 119 is adjusted by the reference level end 118 which is set to correspond to the suction intensity of the soil water in the area of the water supply sockets 102. The suction intensity can be indicated by a vacuum gauge 133. If desired, pressure gauges with suitable scale division can be calibrated by rotation of the scale. The vacuum gauge 133 is set to show the value zero when the reference level 119 of the water in the cleansing shaft 132 is on the level of the upper edge of the water supply sockets 102. At the cleansing shaft 132 a pressure gauge 135 connects to a measuring tube 134 for indication of the water level in cleansing shaft 132.

During use, the water level in cleansing shaft 132 may fall below reference level 119, which is adjusted with reference level end 118, and water tank 122. If this should occur, the water supply to cleansing shaft 132 may be blocked by impurities or air bubbles in pipeline 105. By activation of cleansing valve 136 to supply pipe 129 one can purge and clean pipeline 105 by flowing water from inlet 29 into pipeline 105. The cleansing operation continues as long as the water level in cleansing shaft 132 is below the level of water supply sockets 102.

The cleansing of pipeline 105 forces the cleansing water into cleansing shaft 132 with the particles or sediment settling in the lower part of cleansing shaft 132. A sump vessel 137, located at the bottom of cleansing shaft 132, collects the sediment at the bottom of cleansing shaft 132. After deposition of the particles or sediment cleansing water is sucked from above the sump vessel 37 via cleansing pipe 138 into pipeline 105.

In an alternate embodiment of the invention, according to FIG. 14, the pipeline system is provided with an air collecting vessel 129 which collects the air bubbles via an air collecting valve 140 which is separated from the water under suction intensity. Supply pipe 129 connects to air collecting valve 140 in such a manner that during the filling of water tank 122 the collected air flows out of air collecting vessel 139 into water tank 122 by the water running through supply pipe 129 and reaches from there via water supply unit 104 and the ventilation end 120 the open air.

An elbow with an inspection glass 142 may be attached to the ventilation end 120 as a special accessory whereby the inspection glass 142 can be filled partly with water through an open filling vessel 143. The ascending air bubbles in the inspection glass 142 indicates the water consumption from water tank 122. The volume of the air bubbles corresponds with the volume of the supplied water to the soil 101 from water supply unit 104.

For the use of natural water, which can be raised without additional energy by the suction intensity at water supply sockets 102 the invention uses a ground valve 144 above the ground surface. The ground water can supply the watering system via ground water valve 144 when the ground water level 145 in the open well tube 146 reaches at least the reference level 119 in cleansing shaft 132. For determination of the ground water level a ground water pressure gauge 147 is provided at well tube 146.

For the ventilation of well suction tube 148 and ground water pipeline 149, a ventilation vessel 150 is provided which connects with pipeline 149 through a ventilation valve 151. The incoming water in tube 129 forces the air in ventilation vessel 150 out ventilation vessel 150 via a ventilation tube 152 connected to well suction tube 148.

Shutting off supply pipe 129 by closing ventilation valve 151 simultaneously opens ventilation vessel 150 to the ground water pipeline 149. By opening of ground water valve 144 to the well suction tube 148 and ground water pipeline 149, permits the well suction tube 148 to be filled with water from ventilation vessel 150. The remaining water level in the ventilation vessel 150 permits the water level in the cleansing shaft 132 to balance with the ground water level 145 in the well tube 146 according to the principle of the communicating vessels wherein the water seeks its own level in vessels in fluid communication with each other. The watering system according to the invention is supplied by ground water.

The described operations concerning the filling and cleansing of the watering system can be performed automatically. For this purpose the pressure gauges 125, 135, 141, 147 and 153 are provided with electrical contacts which are operated at a preset pressure value and the valves 130, 136, 140, 144 and 151 are changed into electromagnetical operated valves. The respective contacts and magnets are to be connected correspondingly.

Thus it will be apparent that various water supply systems are useable in conjunction with the soil suction phenomenon as long as the water supply systems are capable of maintaining a constant level of water for use in irrigation.

I claim:

1. An underground root watering system comprising a water reservoir and a pipeline located in the ground, said water reservoir being connected to said underground pipeline, further comprising a plurality of water supply units connected to said underground pipeline and surrounded by the ground, said water supply units being arranged at the same first level, characterized by means 132 being continuously always connected to the pipeline 105 and having a water level 119 which is lower than said first level of said supply units 102 and a control means 114 being capable of adjusting the watering system to a certain sucking tension of the soil and of automatically supplying the pipeline 105 with water according to the actual sucking tension of the soil around the supply units 102.

2. The watering system according to claim 1 wherein said water supply outlets include water supply units covered with cylindric caps having spaced brackets.

3. The watering system according to claim 2 comprising water supply sockets having foam material plugs therein to prevent growth of plant roots therein.

4. The watering system according to claim 3 including a drip ring located in said cylindrical caps for the generation of water drops.

5. The watering system according to claim 4 comprising a sump vessel connected to said pipeline for depositing sediment from the watering system therein.

6. The watering system according to claim 5 including an air collecting vessel which is ventilated via said water supply unit during the filling of said water tank.

7. An underground root watering system according to claim 1, characterized in that the control means 114 comprise a tube 111 in which a ventilation tube 116 is located, the lower end 118 of which defines the reference level 119 of the water in said means 132.

8. An underground root watering system according to claim 1 wherein said water supply units each comprise a vertical outlet pipe having an open top end, a foam material plug to prevent growth of plant roots into the water outlet, and a cap that has a larger diameter than said vertical pipe and a sidewall that extends down beyond the top open end of said outlet pipe, said cap comprising support means for engaging said vertical outlet pipe without blocking off any substantial portion of the open end of said vertical outlet pipe.

9. An underground root watering system comprising a water reservoir and a pipeline located in the ground, said water reservoir being connected to said underground pipeline, further comprising a plurality of water supply units connected to said underground pipeline, said water supply units having inlets and outlets characterized by:

(a) at least a first water receiving and supply unit 129 being connected to said water reservoir 122 as well as to one end of said pipeline 105;

(b) at least one container 132 being connected to the other end of said pipeline 105 and being capable of receiving water;

(c) water supply units 102 the inlets of which are connected to the pipeline 105 and the outlets of which are arranged along a line being in parallel to and outside of the pipeline 105;

(d) said water supply units 102 having means 106 at the upper side of the pipeline to shield the water outlet in said water supply units 102 against penetration by soil and plant roots.

10. A watering system for supplying water to roots in soil comprising water feed means comprising a plurality of serially connected water supply outlets located at substantially the same level as the soil, a water supply unit having a top and a bottom which is inserted into a hole in the soil so that said bottom is positioned below ground level and below the level of said water supply outlets, a ventilation tube located in said water supply unit that extends through the top of said water supply unit where it is vented the atmosphere, to a preselected reference level from the bottom of said water supply unit, water tank means comprising a first tank sealed during filling and having lower and upper ends, water control means comprising pipe means coupled for selectively filling said water supply units to said reference level and said first tank to a predetermined level from the bottom of said water supply unit and from the lower end of said first tank, respectively, and for selectively supplying water from an above ground level to said water feed means from said first tank when water supply unit is below said reference level and from said water supply unit when water in said water supply unit is above said reference level.

11. A watering system as claimed in claim 10 wherein said water control means comprises air outlet means coupled between the upper end of said first tank and the top of said water supply means.

12. A watering system as claimed in claim 10 comprising ground water collection means and ground water supply means for supplying ground water from said collection means to said reservoir when the water in said collection means exceeds a predetermined level.

13. A watering system as claimed in claim 12 comprising a sealed water supply unit having lower and upper ends, feed means and ventilation means wherein said ground water collection means comprises container means that has a bottom positioned approximately to the same depth in the soil as the bottom of said reservoir, a second ventilation tube coupled to the upper end of said sealed water supply outlet and to said ventilation means wherein said ventilation means extends to a predetermined control level from the bottom of said collection means, water supply means coupled between the lower end of said sealed water supply unit and said ventilation means for selectively supplying water to said sealed water supply unit by suction from said collection means and said feed means is coupled to said lower end of said sealed water supply unit for selectively supplying water from said sealed water supply unit to said reservoir when water in said collection means exceeds a predetermined level.

14. A watering system as claimed in claim 10 wherein said water tank means comprises a second tank having a top and bottom, first coupling means for selectively supplying water from the bottom of said second tank to said water feed means and second coupling means for selectively coupling the top of said second tank to said pipe means for receiving air bubbles from said first tank and said water supply unit.

15. A watering system as claimed in claim 10 wherein said water supply outlets each comprise a vertical outlet pipe having an open top end and a cap that has a larger diameter than said vertical pipe and a sidewall that extends down beyond the top open end of said outlet pipe, said cap comprising support means for engaging said vertical outlet pipe without blocking off any substantial portion of the open end of said vertical outlet pipe.

16. A watering system as claimed in claim 15 comprising drip means located in said cap for the generation of water drops.

17. A watering system as claimed in claim 16 wherein said support means comprises a plurality of inwardly extending brackets which project from said sidewall only part way toward the center of said cap and said drip means comprises a downward projection from each of said brackets for dripping water to prevent root growth toward said cap.

18. A watering system as claimed in claim 10 further comprising a reservoir having a top and a bottom which is inserted into a hole in the ground with said top of said reservoir being vented to the atmosphere and said bottom of said reservoir being located in the ground to provide for a predetermined suction intensity depth for the soil to exist between said water supply outlets and the water level in said reservoir to enable said reservoir to supply water to said feed means from a below ground level, wherein said feed means comprises a terminal end pipe which extends downwardly after all of said water supply outlets have been supplied water by said feed means, wherein said terminal end pipe is coupled to said reservoir at a predetermined spaced location from the bottom of said reservoir to allow for the collection of sediment therein.

19. A watering system as claimed in claim 18 comprising drip means located in said water supply outlets for the generation of water drops.

20. A watering system as claimed in claim 11 wherein said supply units include a drip cap with a sidewall and a center having a plurality of inwardly extending brackets which project from said sidewall only part way toward the center of said cap and drip means comprising a downward projection from each of said drip caps for dripping water to prevent root growth toward said cap.

\* \* \* \* \*